Figure 1:
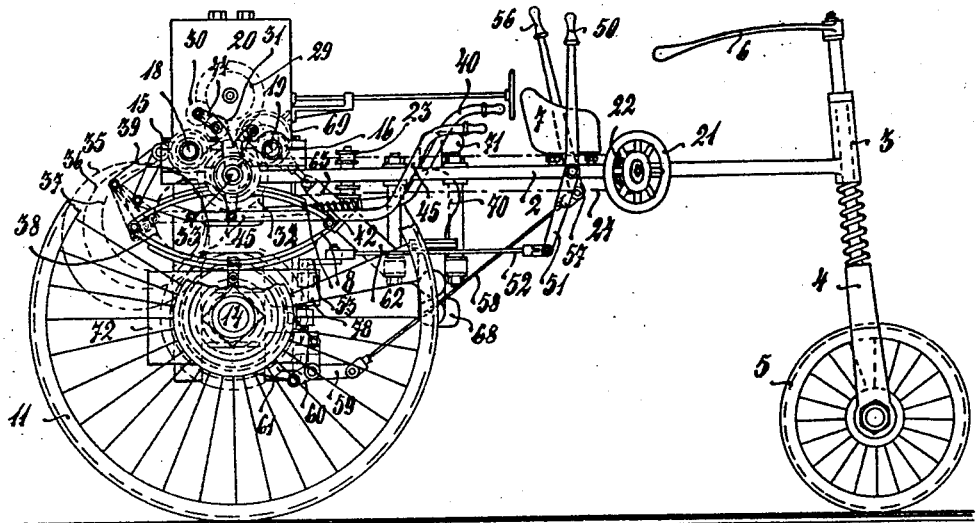

No. 823,719. PATENTED JUNE 19, 1906.
A. FRÖDE.
MOTOR VEHICLE.
APPLICATION FILED APR. 19, 1904.

2 SHEETS—SHEET 1.

WITNESSES:
Paul Lange.
Carl Krehan

INVENTOR:
Albert Fröde

No. 823,719. PATENTED JUNE 19, 1906.
A. FRÖDE.
MOTOR VEHICLE.
APPLICATION FILED APR. 19, 1904.

2 SHEETS—SHEET 2.

WITNESSES:
Paul Lange.
Carl Krehan.

INVENTOR:
Albert Fröde.

UNITED STATES PATENT OFFICE.

ALBERT FRÖDE, OF BAUTZEN, GERMANY.

MOTOR-VEHICLE.

No. 823,719.     Specification of Letters Patent.     Patented June 19, 1906.

Application filed April 19, 1904. Serial No. 203,959.

*To all whom it may concern:*

Be it known that I, ALBERT FRÖDE, manufacturer, a subject of the King of Saxony, and a resident of 10 Fischerpforte, in Bautzen, in the Kingdom of Saxony, German Empire, have invented certain new and useful Improvements in Motor-Vehicles for Agricultural Purposes, of which the following is a specification.

This invention concerns a motor-vehicle for agricultural purposes—that is to say, an agricultural universal automobile which may be used as a motor in performing agricultural labors and as such satisfies in the most perfect manner all the demands that could be made on it.

The new motor-vehicles can be made to serve as an agricultural automobile for plowing, harrowing, sowing, mowing, sheaving, grass-cutting, hay-making, and so on; further, as an engine or locomobile for threshing, chaff-cutting, churning, pumping, generating electric light, and so on; further, for drawing harvesting-cars and so on, also for watering gardens and fields and for extinguishing fires.

An important point with this invention is that the motor or the engine of the motor-vehicle is so arranged that it can be shifted laterally in such a manner that one side of the motor-car may be more or less loaded. This arrangement is of great value, for the reason that by means of the same if the motor-vehicle or the hind part of it, which carries the motor, is connected with an agricultural implement—mowing-machine, plowing-machine, sowing apparatus, or the like—this working side of the motor may by a corresponding shifting be loaded so much more that the efficiency of the respective agricultural implement or machine is increased by the higher pressure exerted upon it. Diminishing the load is, on the other hand, necessary when a machine is connected with the motor, which requires less driving-power—for instance, a mowing-machine and the like. In consequence of the shiftableness of the motor there is, moreover, attained the advantage that the motor-vehicle may be proportionately light, and can therefore be used also for working soft soil. It is further possible to compensate or balance the load so that with a one-sided loading the less loaded side does not run in advance of the other and that thus the vehicle is able to move forward in a straight line. The possibility of shifting the ce    of gravity has, further, the great advantage that the motor-vehicle which forms the subject of this invention can move about and work on slanting soil or inclined surfaces, which it is rather frequently required to do.

The invention finally offers several other advantages profitable to agriculture, but which may not be mentioned here in support of the patentability of the invention, as they are less essential.

This motor-vehicle may of course be of many different forms of construction, and it would lead too far to enter into all the details here. The leading principle of all these constructions would be the displacing of the center of gravity—in other words, the shiftableness of the motor—so that for describing the invention the form of construction shown on the accompanying drawings may be used without limiting thereby in any way the variations which would naturally be covered by the patent applied for.

Figure 2:
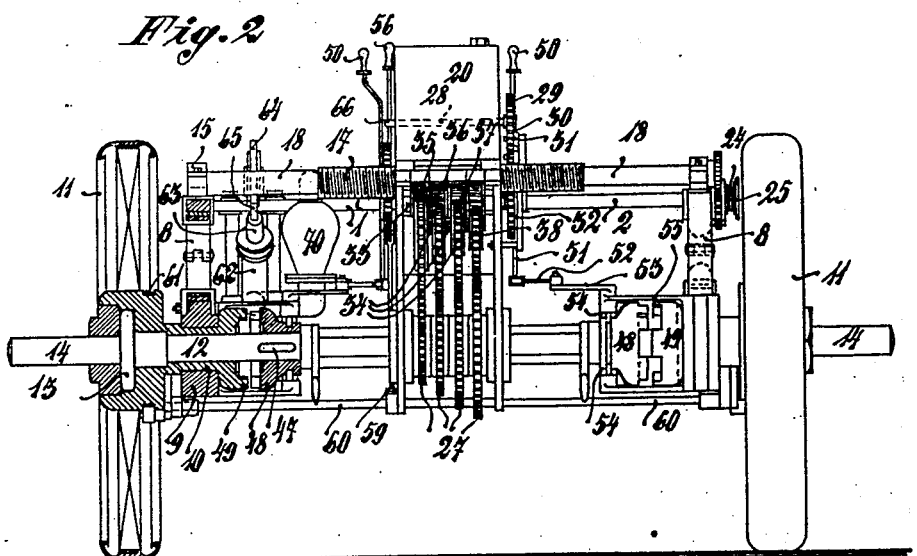
Figure 5:
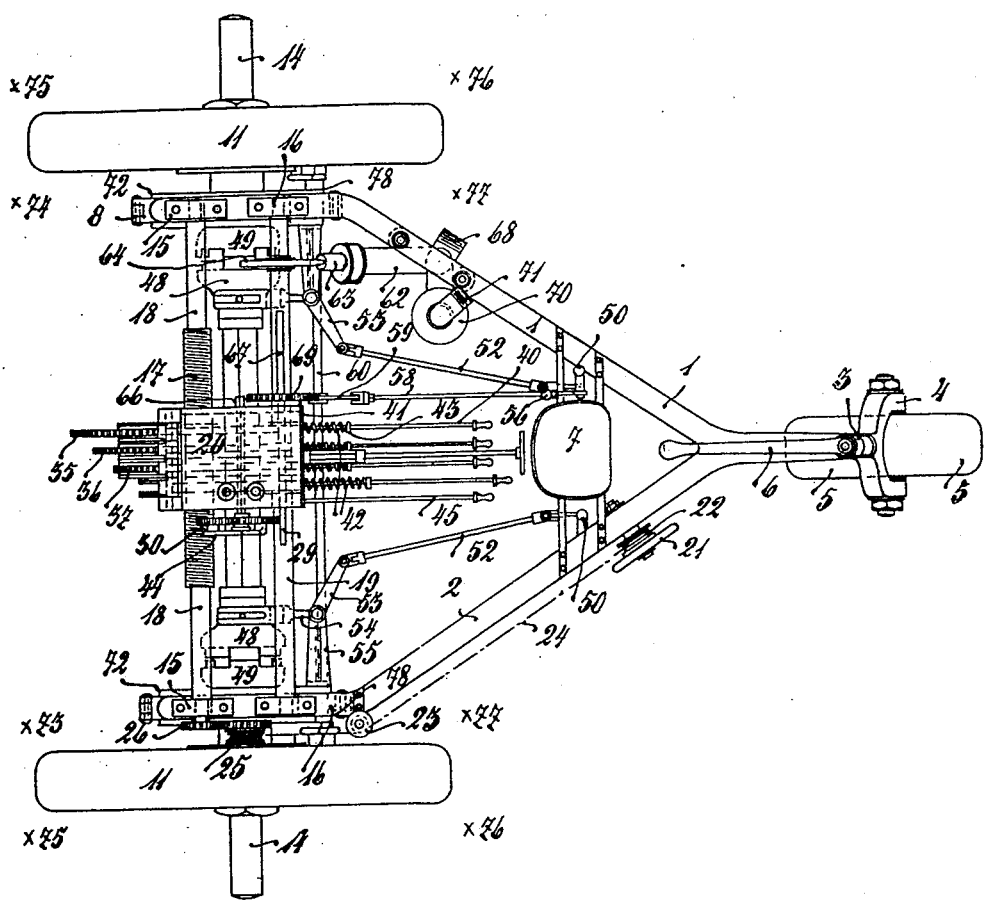

On the accompanying drawings the invention is illustrated in Figure 1 in a side view; Fig. 2, in a back view; Fig. 3, in a plan or top view.

Similar characters refer to similar parts throughout the several views.

The shiftableness of the motor and its arrangement on the vehicle is as follows: On the supports 1 and 2, resting on the springs 8, there are provided two bearings 15 and 16, in which are guided the two bars 18 and 19, one of which, 18, is provided in the middle with a thread 17. By means of the same and a nut provided on the motor, which nut engages the said thread, the motor 20 can be adjusted by turning the hand-wheel 21 on the right of the seat 7 of the driver. The transmission of the motion from the hand-wheel 21 to the motor 20 is effected by a chain-wheel 22, attached to the hand-wheel 21, over which chain-wheel runs a chain 24, which after passing over two guide-pulleys 23 runs over another chain-wheel 25, which is so connected with the toothed wheelwork 26 that the same may be rotated with the bar 18 in one direction or the other. This transmission may also be effected in another and more simple manner—for instance, by making the chain 24 pass directly from the toothed wheel 22 over the toothed wheel on the rack 18. With this arrangement the mechanism which transmits the power from the driving-shaft of the motor 20 to the driving-shaft of the automobile may either be shiftable directly with the motor or, as mentioned further on, it may be rigidly fixed, so that only the motor 20 can be shifted. It is in that case possible to shift the motor 20 sidewise close up to the springs 8. For this purpose there has been arranged on the axle 12, the middle piece of which is of an angular shape, a bush or collar sliding to and fro on this middle piece and rigidly connected to the motor 20. Upon this collar wheels 27 are keyed for the different speeds of the automobile. If now the driving-shaft 28 is rotated by the motor, the transmission is effected by a toothed wheel 29 on the driving-shaft 28 gearing with a toothed wheel 32 through the toothed wheels 30 and 31. This wheel 32 is arranged on a shaft 33, provided with a toothed wheel 34, with which the toothed wheels 35 36 37 38 may be made to gear. If this is done by means of the handles provided for this purpose and if one of the toothed wheels 35 36 37 38 is made to gear with the toothed wheel 34 and one of the wheels 27, the connection between and transmission of power from the motor 20 to the driving-shaft 12 is established, and the automobile can, according to the speed for which it is adjusted, drive faster or slower.

The construction and arrangement of the levers for adjusting the speed is as follows: On the front wall of the motor is arranged a plate 41 with slits, through which pass the hand-levers 40. The latter are provided with catches in suitable places at the lower edge which engage with the plate 41 when the lever is pressed back contrary to the tension of the springs 42. These springs 42 rest with one end against the plate 41, with the other against regulating-rings 43 on the levers 40. If, therefore, a lever 40 is raised, the respective toothed wheel 35 36 37 38 is set to gear with the corresponding toothed wheel 27 and at the same time with the long-toothed wheel 34. The retrograde motion of the motor is effected by the toothed wheel 30 being thrown out of gear with the toothed wheel 29, for the toothed wheel 30 is journaled with the toothed wheel 31 in a shear 44, capable of pendulating around a shaft 33 of the two toothed wheels 32 and 34. This shear carries the disengaging lever 45, which, like the levers 40, has its handle near the seat 7 and has also at its lower edge two catches, with which in its end positions it can be hooked into the plate 41. On the shear 44 is provided another toothed wheel 46, which, the same as the toothed wheel 31, is in constant gear with the toothed wheel 32. If now the lever 45 is moved out of the position shown in Fig. 1, the toothed wheels 30 and 29 are thrown out of gear, while the toothed wheel 46 is set to gear with the toothed wheel 29. In consequence of this the transmission of power from the motor-shaft to the driving-axle is effected with one wheel less than before, as a result of which the automobile is moved backward. On the driving-axle 12 of the automobile there are further arranged two clutch-couplings, by means of which the two large hind wheels 11 may be disconnected if the automobile is to supply power while standing still. The construction of this mechanism is such that there are arranged on the axle 12 two halves of clutch-couplings 48, which are keyed onto it by means of sliding wedges 47 and can be shifted in an axial direction. Opposite to these clutch-coupling halves are the clutches 49 of the coupling-halves affixed to the naves of the wheels 11, so that through the coupling 48 49 the axle 12 may be connected with the wheels 11. The throwing into and out of gear of the two coupling-halves is effected by means of two hand-levers 50, which stand out at the two sides of the seat 7 and whose two lower ends 51 move the angle-levers 53 through the drawing-rods 52, whose other arms 54 catch around the clutch-coupling halves 48 by means of forks. The angle-levers 53 54 are fastened to the supports or parts 1 and 2 of the frame by means of the little trestles 55.

If the two hind wheels are disconnected in order to use the automobile as a stationary engine, on the prolonged ends 14 of the axle 12 a belt-pulley may be affixed, by which the power of the motor may be transmitted to another machine.

At the side of the seat 7 there is, further, the hand-lever 56, which serves as a brake through the arrangement that the other end of the same, 57, works a lever 59 on the shaft 60 through the drawing-rods 58, whose ends carry the working levers for the bands of the brake placed around the naves of the wheels.

If, for instance, the automobile is to be used as a fire-engine or as a squirt or water-sprinkler, the following squirting device may be applied: The bar 19, which serves to drive and carry the motor, may at the same time be used for connecting the motor with a pump 62. Opposite to the plunger-piston 63 is arranged—in that case on the bar 19—the eccentric 64, which works the plunger-piston through the short bar 65. After a special toothed wheel has been put upon the end 66 of the motor-shaft 28, which extends to both sides of the motor, the pump may be started by this special toothed wheel engaging the toothed wheel 69 on the bar 19. The toothed wheel 69 is connected with the latter through a sliding wedge in the groove 67 of the bar 19, so that at every position of the motor to the middle plane of the driver the pump 62 may be set to work. This pump sucks up the liquid through the socket 68 and drives it through the air-chamber 70 to the discharge-socket 71.

The automobile, which, as already said, is an agricultural universal automobile and has, therefore, the most variegated labors to perform, draws or carries the devices or apparatus required for this. The simplest mode to attain this, where there is merely a question of drawing or driving, is to arrange two hooks on the axle. To this can be attached a large rake or harrow, and so on, and on the road harvesting-cars and so on may be hung on. With another mode of fastening a cross-beam of a suitable shape is screwed oint the divided axle-boxes or into the clamps arranged on these, to which the respective implement may be attached. A further mode of fastening is the following: To the clamps $q$, arranged in front and behind, is affixed a frame which is placed around the whole wheel and is fastened on the other side upon the prolonged piece 14 of the axle 12. This frame is then supported all around at the points 72 and 73 and 74 and 75, 76, 77, and 78, Fig. 1. At the points 75 and 77 the frame is fastened by screws. The frame might also be interrupted from 72 to 79 and go from there to 80, 81, 82, 83, and 84, and then to 72, (on the other side.) It may be arranged vertically or horizontally. To such a device it is easy to hang or attach a plow, a harrow, and so on. A harrow, roller, and so on may also be hung or attached to a hook fastened to the frame. On the parts 74 73 and 73 75 a sowing-box or the like may be put and eventually be supported by two guiding-rollers. In short, there is a variety of ways in which an agricultural implement may be attached. By means of this device a plow, harrow, potato-drill, and so on may also easily be hung on in such a manner that the object of the shiftableness of the motor will be close to the axle of the hind wheel. In this way the plow, harrow, and so on will be brought nearer the point upon or over which the pressure is to be directly exerted.

The shiftableness of the motor may of course be attained in another way than the above described. As already stated, it is also possible to shift the motor still farther sidewise while retaining the same arrangement allowing of fixing the mechanism of the transmission and so on independently of the motor—that is to say, rigidly or immovably. The description of this arrangement is as follows: Between the two bars 18 and 19 and on a level with the same is a third bar which forms a long-toothed wheel. With this long-toothed wheel is connected the motor-shaft 28, and this is able to drive the long-toothed wheel and, in combination with a pair of transmission-wheels 35, 36, 37, or 38 and 27, the axle 12, and thereby also the automobile. The whole mechanism for the transmission and for altering the speed is, however, arranged rigidly and is placed in the middle of the automobile. It is on the whole similar to the above-described mechanism, only the plate 41, through whose slits pass the levers for altering the speed, is fixed independently of the motor. This plate is therefore no longer on the motor, but may be arranged anywhere else. The mechanism for the retrograde movement may likewise be rigidly fixed, when of course it requires to be arranged under the long-toothed wheel for the variations of speed. It may of course be near the top of the motor; but it must then follow the movements of the same. It is therefore advisable to arrange this single lever where the majority of the others are if the same are not shiftable The connection of the motor-shaft with the fire-engine may with this arrangement be established through the long-toothed wheel. The last-described arrangement for the shiftableness of the motor has in so far a great advantage, as the motor may now be shifted sidewise up to the springs 8, whereby the advantage aimed at by the shiftableness of the motor is considerably increased As to the differential mechanism, which as a rule is on the left of the axle-box on the left side of the automobile, the same may with the last-described arrangement of the construction for the shiftableness of the motor most advantageously be placed inside—that is to say, beneath the wheels 27.

What I claim as my invention, and desire to secure by United States Letters Patent, is—

A motor-vehicle for agricultural purposes, in which the motor 20 is arranged on two cross-bars 18 and 19 on which it can be shifted and of which one is provided with a screw-thread 17 in a manner that the lateral shifting of the motor 20 may be effected from the seat 7 of the driver by means of suitable transmission devices, substantially as set forth.

In witness whereof I have hereunto signed my name, this 26th day of March, 1904, in the presence of two subscribing witnesses.

ALBERT FRÖDE.

Witnesses:
PAUL E. SCHILLING,
PAUL ARRAS.